No. 645,972. Patented Mar. 27, 1900.
A. E. PRICE.
THRESHING MACHINE.
(Application filed Apr. 26, 1899.)
(No Model.)

WITNESSES
Wm H McGrann
Bertha L Dana

INVENTOR
Abraham E. Price.
by Herbert W. T. Jenner.
Attorney

UNITED STATES PATENT OFFICE.

ABRAHAM E. PRICE, OF WAYNESBOROUGH, PENNSYLVANIA.

THRESHING-MACHINE.

SPECIFICATION forming part of Letters Patent No. 645,972, dated March 27, 1900.

Application filed April 26, 1899. Serial No. 714,475. (No model.)

*To all whom it may concern:*

Be it known that I, ABRAHAM E. PRICE, a citizen of the United States, residing at Waynesborough, in the county of Franklin and State of Pennsylvania, have invented certain new and useful Improvements in Threshing-Machines; and I do hereby declare the following to be a full, clear, and exact description of the invention, such as will enable others skilled in the art to which it appertains to make and use the same.

This invention relates to threshing-machines; and it consists in the novel construction and combination of the parts hereinafter fully described and claimed.

Figure 1:
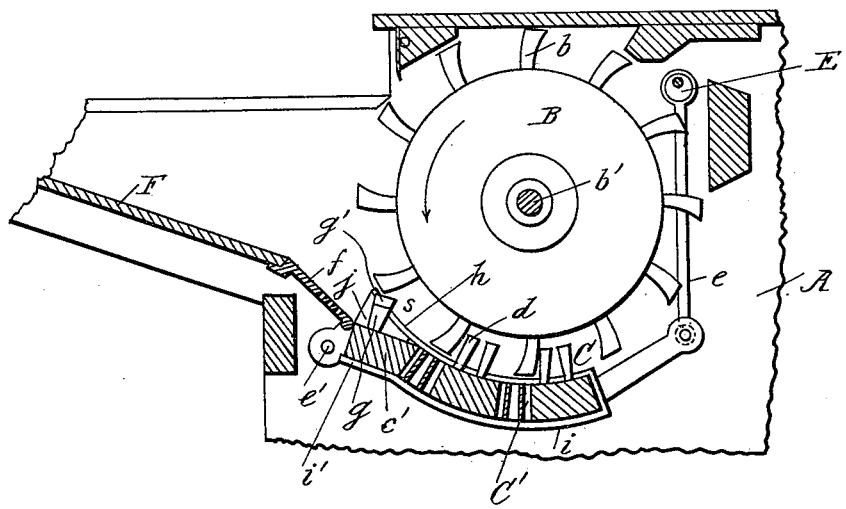
Figure 2:
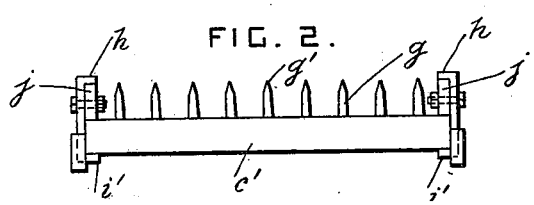
Figure 3:
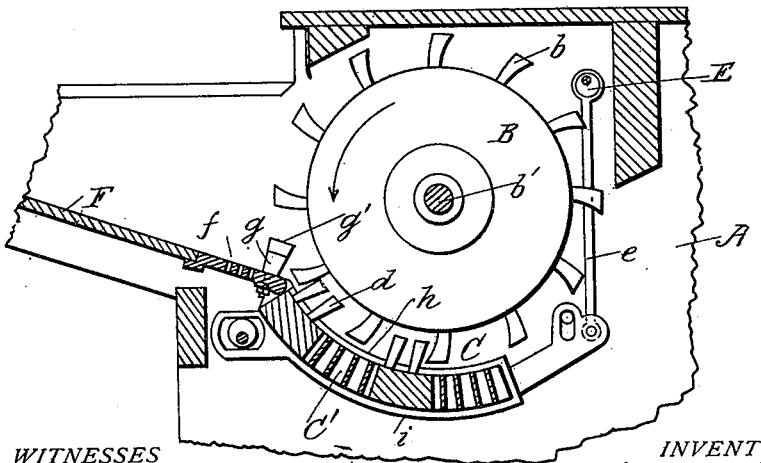

In the drawings, Figure 1 is a sectional side view of a threshing-cylinder and concave provided with improvements according to this invention. Fig. 2 is a front end view of the front bar of the concave and its bearers, showing the retarding-teeth. Fig. 3 is a view similar to Fig. 1, but showing a modification.

A is a portion of the casing of the machine.

B is the threshing-cylinder, provided with threshing-teeth $b$ and mounted on the driving-shaft $b'$.

C is the concave, having bars $c$, carried by bearers D and provided with threshing-teeth $d$. The concave may be fixed in its relation to the cylinder; but it is preferably adjustable, and any approved mechanism may be used for adjusting it, such as eccentrics E and bars $e$, attached to the rear end portions of the bearers, the front end portions either being pivoted on pins $e'$ or also adjusted by means of eccentrics.

$C'$ are the distance-bars of the concave.

F is the downwardly and rearwardly inclined feed-board, and $f$ is a grate between the lower end of the feed-board and the concave.

All the above-mentioned parts are of any approved construction.

In the operation of threshing the grain slides down the feed-board and grate in bunches and is seized by the teeth of the cylinder and dragged forcibly between the teeth of the concave. In order to prevent the teeth of the cylinder from dragging in too much grain at once and to insure the grain being drawn in gradually and in a thin and even stream, a row of auxiliary teeth $g$ is provided in front of the threshing-teeth at the entrance to the concave. These teeth $g$ are arranged at a short distance in advance of the threshing-teeth of the concave and so that the grain strikes against them and is retarded by them at intervals across the cylinder before being seized by the teeth of the cylinder. The teeth $g$ have no threshing action, as their front edges are wholly in advance of the path of travel of the cylinder-teeth. The teeth $g$ differ from the threshing-teeth in being broader and in having beveled cutting edges $g'$ at their tops. These beveled top edges permit the cylinder-teeth to press the straw downward into engagement with the threshing-teeth of the concave without shock. The concave is preferably provided with a converging entrance $s$, and the teeth $g$ are arranged in this entrance so that the threshing-teeth of the cylinder will come between them and downwardly toward their top edges.

The teeth $g$ may be supported by the front bar $c'$ of the concave when the front bar is supported at an angle to the periphery of the cylinder, as shown in Fig. 1. The upper flange $h$ of each bearer is substantially concentric with the cylinder throughout its length, and the lower flange $i$ is parallel with the upper flange for the greater portion of its length and has a front portion $i'$, arranged at an angle to the periphery of the cylinder. The front bar $c'$ of the concave rests on the portions $i'$ and is secured by wedge-shaped keys $j$, bolted to the bearers, so that the bar cannot rise.

In the modification shown in Fig. 3 the retarding-teeth $g$ are bolted to the lower part of the grate $f$ at the entrance to the concave instead of being secured to the front bar of the concave, and their operation is the same as hereinbefore described.

What I claim is—

1. The combination, with a threshing-cylinder, of concave-bearers provided with flanges having diverging portions at their front ends, toothed bars supported by the said flanges, and wedges for securing the front bar between the said diverging front portions of the flanges, substantially as set forth.

2. The combination, with a cylinder provided with threshing-teeth, of concave-bearers provided with upper flanges arranged substantially concentric with the cylinder, and lower flanges having rear portions parallel with the upper flanges and front portions arranged at an angle to said rear portions, concave-bars provided with threshing-teeth and carried by the rear portions of the said lower flanges, a front bar provided with retarding-teeth and carried by the front portions of the said lower flanges, and wedges for preventing the said front bar from rising, substantially as set forth.

In testimony whereof I affix my signature in presence of two witnesses.

ABRAHAM E. PRICE.

Witnesses:
D. M. RUSSELL,
ALF N. RUSSELL.